(12) United States Patent
Waggoner (10) Patent No.: US 10,212,466 B1
(45) Date of Patent: Feb. 19, 2019

(54) ACTIVE REGION FRAME PLAYBACK

(71) Applicant: Amazon Technologies, Inc., Seattle, WA (US)

(72) Inventor: Charles Benjamin Franklin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 15/195,815

(22) Filed: Jun. 28, 2016

(51) Int. Cl.
| | |
|---|---|
| *H04N 21/81* | (2011.01) |
| *H04N 21/258* | (2011.01) |
| *H04N 21/414* | (2011.01) |
| *H04N 21/2343* | (2011.01) |
| *H04N 21/2668* | (2011.01) |

(52) U.S. Cl.
CPC . *H04N 21/25825* (2013.01); *H04N 21/23439* (2013.01); *H04N 21/234345* (2013.01); *H04N 21/234372* (2013.01); *H04N 21/2668* (2013.01); *H04N 21/41407* (2013.01); *H04N 21/816* (2013.01)

(58) Field of Classification Search
CPC ....... H04N 21/25825; H04N 21/41407; H04N 21/234345; H04N 21/816; H04N 21/2668; H04N 21/234372
See application file for complete search history.

(56) References Cited

U.S. PATENT DOCUMENTS

| | | | | |
|---|---|---|---|---|
| 5,541,662 | A * | 7/1996 | Adams | G06F 3/14 348/460 |
| 5,727,141 | A * | 3/1998 | Hoddie | G06F 3/04842 345/475 |
| 6,496,981 | B1 | 12/2002 | Wistendahl et al. | |
| 8,194,101 | B1 * | 6/2012 | Mann | G09G 5/00 345/633 |
| 2002/0047918 | A1 * | 4/2002 | Sullivan | H04N 7/08 348/397.1 |
| 2008/0172718 | A1 * | 7/2008 | Bradley | G06F 21/10 726/1 |
| 2009/0183078 | A1 * | 7/2009 | Clement | G11B 27/034 715/723 |
| 2011/0176790 | A1 * | 7/2011 | Morris | H04N 21/43615 386/299 |
| 2013/0179588 | A1 * | 7/2013 | McCarthy | H04N 21/23418 709/231 |
| 2015/0095460 | A1 * | 4/2015 | Berger | H04L 67/06 709/219 |
| 2015/0248198 | A1 * | 9/2015 | Somlai-Fisher | G06F 1/1694 715/716 |
| 2015/0256577 | A1 * | 9/2015 | Gutierrez Vilaro | H04L 67/101 709/203 |
| 2015/0334335 | A1 * | 11/2015 | White | H04N 21/4126 348/734 |
| 2016/0173961 | A1 * | 6/2016 | Coan | H04N 21/812 725/32 |
| 2016/0191961 | A1 * | 6/2016 | Fisher | H04N 21/23430 725/116 |

* cited by examiner

*Primary Examiner* — Nasser M Goodarzi
*Assistant Examiner* — Adil Ocak
(74) *Attorney, Agent, or Firm* — Weaver Austin Villeneuve & Sampson LLP (57) ABSTRACT

Techniques are described for playing back a portion of an image frame of media content. The playback can be based on characteristics of the viewer device and active region data indicating important areas of the image frame.

23 Claims, 6 Drawing Sheets

ACTIVE REGION FRAME PLAYBACK

BACKGROUND

Consumers have an ever-increasing array of options for consuming media content, in terms of the types of media content (e.g., video, audio, text, etc.), providers of the media content, and devices for consuming media content. Media content providers are becoming increasingly sophisticated and effective at providing media content quickly and reliably to consumers.

Media content is often streamed over networks using adaptive bitrate streaming for playback on viewer devices. Different viewer devices might request playback of the same media content. For example, a television and a smartphone might play back the same movie. However, smartphones have relatively smaller display screens than televisions. Unfortunately, some media content might be difficult to watch on a smaller display screen.

DETAILED DESCRIPTION

This disclosure describes media content playback techniques for playing back a portion of an image frame of the media content. For example, a media server can provide active region data representing the important areas of an image frame that are to be played back. Some viewer devices can play back the image frame of the media content by considering the active region data and characteristics of the viewer device itself, such as the dimensions of the display screen of the viewer device. As a result, viewer devices with smaller display screens might display the image frame differently than viewer devices with larger display screens. For example, a viewer device with a smaller screen might "zoom" in on an active region to provide playback of a portion of the image frame such that it occupies more or all of the display screen, and therefore, is easier for a viewer to watch.

Figure 1:
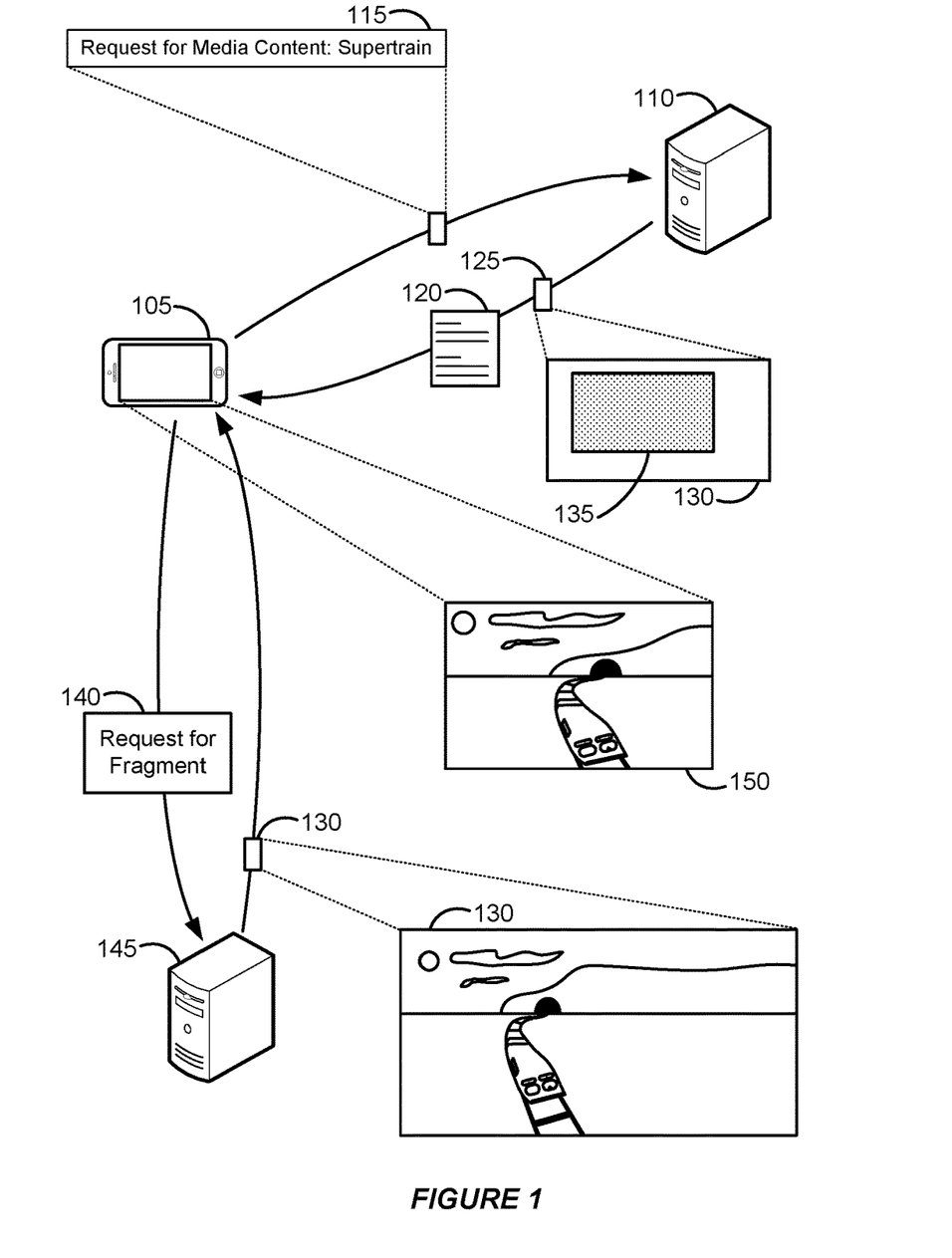
FIG. 1 illustrates an example of playing back a portion of an image frame using active region data.

In more detail, FIG. 1 illustrates an example of playing back a portion of an image frame using active region data. In FIG. 1, viewer device 105 provides request 115 to media server 110 indicating that it wants to play back media content (e.g., Supertrain). Media server 110 receives request 115 and provides manifest data 120 and active region data 125 for the requested media content to viewer device 105. Viewer device 105 uses manifest data 120 to request fragments from edge server 145 (via request 140). Viewer device 105 subsequently receives those fragments, which include image frames (e.g., image frame 130) for playback of the media content using active region data 125.

Manifest data 120 (which can be one or more markup files or other types of data structures, data provided over an API, etc.), provides playback options for the media content by providing metadata that allows a viewer device to generate properly formatted requests for specific fragments of the media content. The playback options can include fragments available at different video quality levels (e.g., different resolutions such as 1080p, 720p, etc. and bitrates at those resolutions), audio quality levels, available subtitles, etc. Viewer device 105 can analyze manifest data 120 and generate a uniform resource locator (URL) directed to edge server 110 and including a query string indicating the specific fragments to be provided by edge server 145. The fragments selected by viewer device 105 to be requested via the URL can be based on an adaptive bitrate heuristic algorithm that considers the hardware capabilities (e.g., central processing unit (CPU) availability, available bandwidth of its Internet connection, etc.) of viewer device 105. The received fragments can then be stored in a playback buffer for playback on a display screen of viewer device 105. Each of the fragments includes several image frames of playback of the media content. For example, a fragment might provide two seconds of playback, which can include many image frames of playback based on the framerate corresponding to the bitrate of the video quality level.

Active region data 125 can represent the more important portions of the image frame that should be emphasized or prioritized during playback. For example, active region data 125 can indicate that image frame 130 includes active region 135. In FIG. 1, active region 135 can represent the coordinates or portion of image frame 130 in which most of the action that a viewer would normally be paying attention. For example, the portion might be where the primary action of the image frame is taking place. The portion of image frame 130 outside of the coordinates of active region 135 might represent background detail or other additional detail useful for framing active region 135. For example, in FIG. 1, active region 135 represents an area of image frame 130 in which a train (Supertrain) is shown exiting a tunnel. The rest of the detail of image frame 130 provides surrounding environmental or landscape detail, for example, for a long or wide shot of the train exiting the tunnel. Additionally, active region 135 can be the same or a different aspect ratio or size than image frame 130.

Though only active region data 125 is shown in FIG. 1, additional active region data regarding the active regions of other image frames of the playback of the media content can also be provided. For example, active region data for each image frame can be provided. In another example, active region data can indicate the important areas for multiple image frames. For example, active region data 125 might be the active region used for several image frames of the playback of the media content.

In FIG. 1, since viewer device 105 is a media device such as a smartphone with a relatively small display screen, displaying all of image frame 130 as received from edge server 145 might result in a playback experience that is difficult for some viewers since the action of the scene (i.e., Supertrain exiting the tunnel) only represents a small portion of the small screen if the image frame is played back in its entirety.

To improve the playback experience, viewer device 105 can use active region data 125 to "zoom" in or emphasize a region of image frame 130 corresponding to active region 135 of active region data 125 such that the action of the scene is more easily viewed during playback on the small screen of viewer device 105. For example, in FIG. 1, viewer device 105 can determine its own device characteristics (e.g., it has a 4-inch screen with a 16:9 aspect ratio) and use its determined characteristics and active region data 125 to play back image frame 130 by displaying, the portion of image frame 130 that is representative of active region 135. For example, only the portion of image frame 130 that has the same coordinates as active region 135 might be displayed. In another example, the portion of image frame 130 corresponding to active region 135 might be centered within the display screen of viewer device 105. This would result in a small portion of image frame 130 outside of active region 135 being displayed.

As a result, some of image frame 130 might not be played back on the display screen of viewer device 105. Rather, only image frame portion 150, which is the area of image frame 130 that is indicated by active region 135 of active region data 125, and some surrounding detail might be played back (e.g., displayed on the display screen). This results in that area occupying more of the screen than it would otherwise occupy if the entirety of image frame 130 was played back. Additionally, viewers with vision problems might be able to watch the media content easier.

Figure 2:
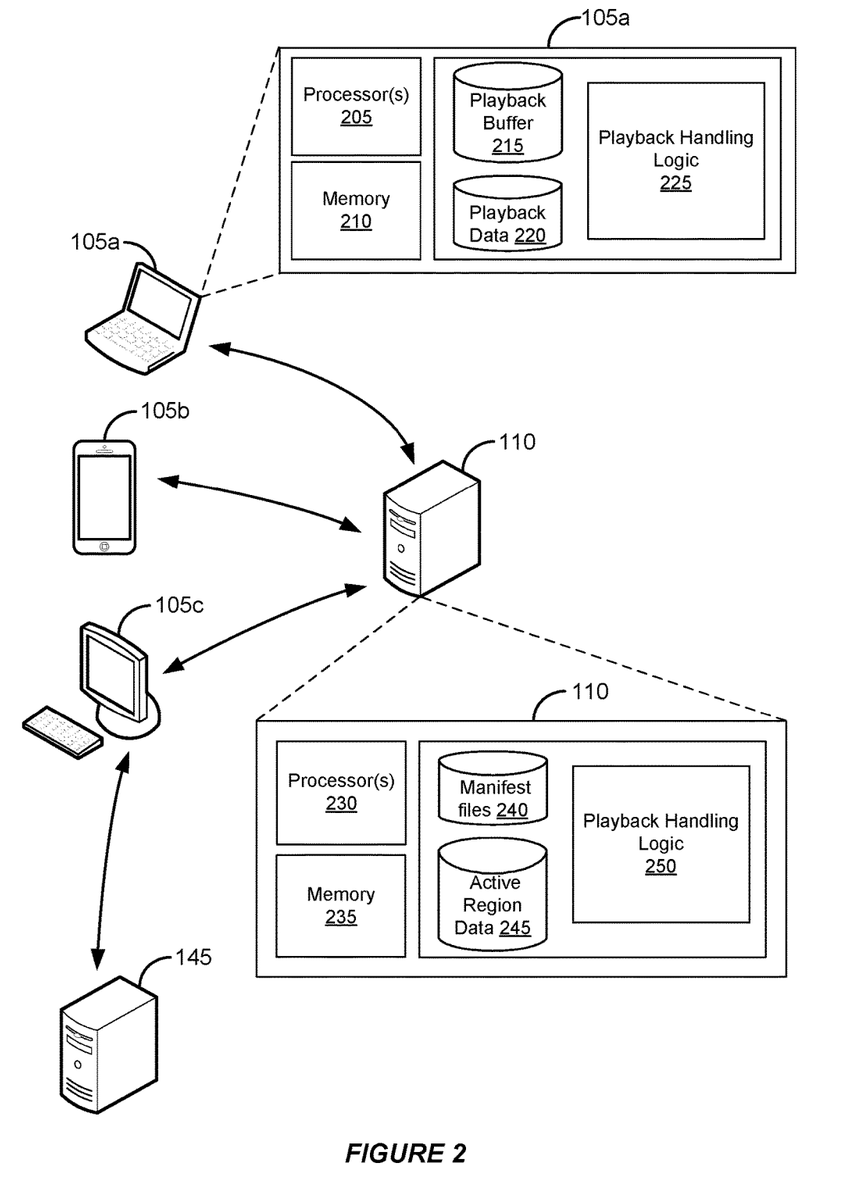
FIG. 2 illustrates an example of a computing environment for playing back a portion of an image frame using active region data.

FIG. 2 illustrates an example of a computing environment for playing back a portion of an image frame using active region data. The computing environment of FIG. 2 includes media server 110 that can be used to receive requests from viewer devices 105*a-c* for manifest files of media content. As previously discussed, media server 110 can provide the manifest files along with active region data to the viewer devices. The viewer devices use the manifest files to request fragments of the media content from edge server 145, which can be part of a content delivery network (CDN), as discussed below. The viewer devices can then play back portions of the image frames of the fragments using the active region data.

In FIG. 2, viewer device 105*a* is a laptop, viewer device 105*b* is a smartphone, and viewer device 105*c* is a desktop computer. However, related functionality may also be implemented within other media devices or electronic devices such as tablets, wearable devices, virtual or augmented reality headsets, video game consoles, etc.

Media server 110 can conform to any of a wide variety of architectures and its functionality may be implemented by a variety of servers. For example, one server might encode media content and the encoded media content might be provided to another server, for example, belonging to a content delivery network (CDN). Another server might generate the active region data. As such, the functionality and components of media server 110 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer devices 105*a-c*), integrated into a separate app from another entity, implemented in an edge server or content server of a CDN, a server of an ISP, etc.

It should be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

In FIG. 2, media server 110 can include various types of logic used to implement playback handling logic 205 to receive requests for manifest files stored in manifest files 240 and provide those requested manifest files along with corresponding active region data from active region data 245 indicating the active regions of image frames of the media content in which its playback options are detailed in the manifest file provided to the viewer device. Media server 110 can include one or more processor circuits 230, memory 235, and other hardware components to provide the manifest files and active region data to viewer devices 105*a-c*. For example, processor circuits 230 can execute stored instructions in memory 235 of media server 110 to implement the techniques disclosed herein.

Active region data stored in active region data 245 can come from a variety of sources. For example, media server 110 can analyze media content and generate or determine the active region of image frames of the media content. As an example, motion tracking of content objects among different image frames, encoding metadata, etc. can be used to generate active region data 245. Active region data 245 can indicate the important portions of image frames to emphasize, for example, by indicating coordinates (e.g., pixel x,y coordinates for a top-right corner and a bottom-left corner, a center coordinate and size of the portion, etc.) or other characteristics (e.g., a quadrant, left-most one-third portion of the image frame, etc.) indicating a portion of the image frame as an active region.

Viewer devices 105*a-c* can also include various types of logic used to implement a video player with playback handling logic 225 to request and receive manifest files from media server 110 and play back the media content. Viewer devices 105*a-c* can also receive active region data from media server 110. The manifest files and active region data can be stored in playback data 220. Using a manifest file, a viewer device can request a fragment from edge server 145 and store that fragment in playback buffer 215. The viewer device can then use the active region data stored in playback data 220 to determine how to play back image frames of the fragment stored in playback buffer 215. Viewer devices 104*a-c* can include one or more processor circuits 205, memory 235, and other hardware components to play back the media content. For example, processor circuits 205 viewer devices 105*a-c* can execute stored instructions in memory 210 of the corresponding viewer device to implement decoding techniques based on the encoding techniques disclosed herein.

Edge server 145 can be part of a CDN including origin servers and one or more severs between the origin servers and edge server 145. In some implementations, the functionality of edge server 145 and media server 110 can be implemented within the same server or part of the same CDN. The functionality of edge server 145 can also be provided by multiple servers. Edge server 145 also includes processor circuits, memory, and other hardware components to receive requests for fragments of media content and provide those requested fragments to a viewer device.

Figure 3A:
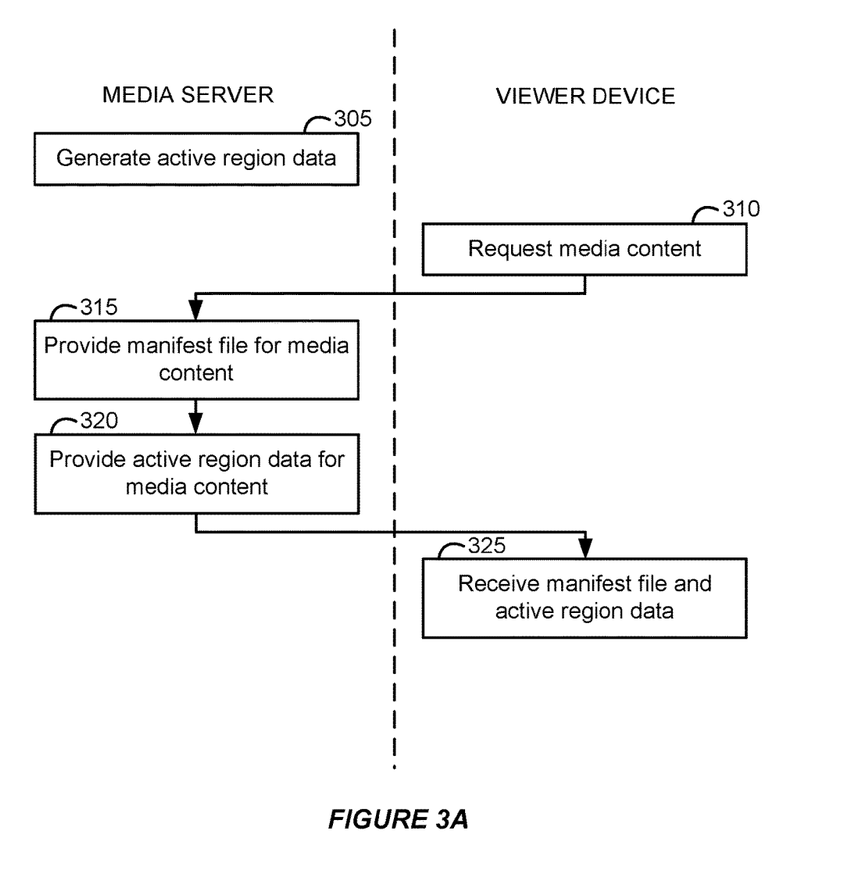
FIGS. 3A and 3B are a flowchart illustrating an example of playing back a portion of an image frame using active region data.
Figure 3B:
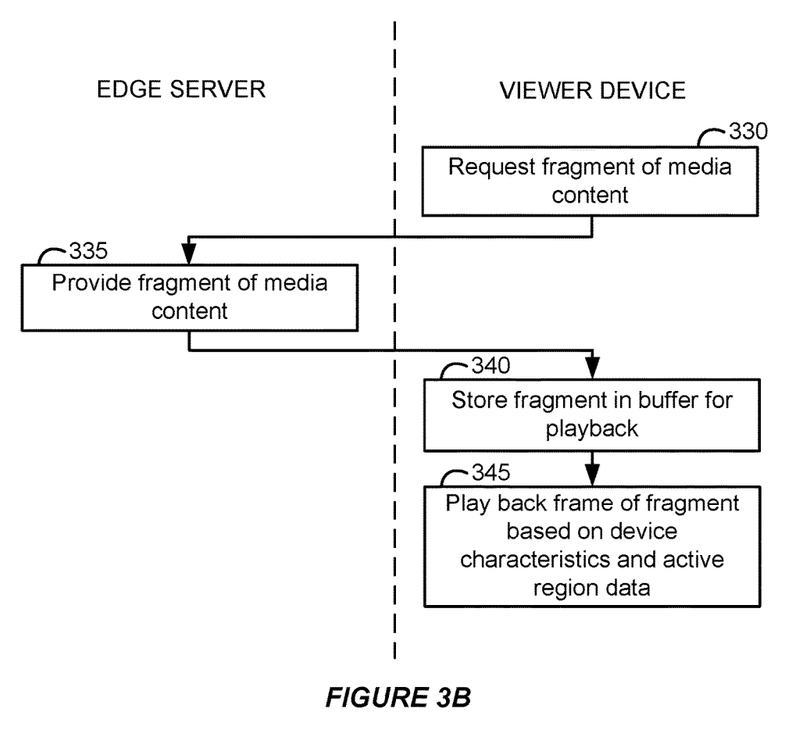

A specific implementation will now be described with reference to FIG. 1, the computing environment of FIG. 2, and the flow diagrams of FIGS. 3A and 3B. In FIG. 3A, active region data can be generated by a media server (305). For example, as previously discussed, media server 110 can determine the active regions of image frames by analyzing the media content. The active region data can be stored and associated with a manifest file. As a result, a request for media content can be a request for the corresponding manifest file providing playback options for the media content and the active region data indicating the important portions of image frames of that media content to be played back on the display screen of a viewer device. In some implementations, the active region data can be generated beforehand and provided to the media server.

Eventually, a viewer device can request to play back media content (310), for example, by selecting media content in a web browser or video streaming application for playback. The media server can receive that request and provide the manifest file for that media content (315) as well as the active region data for that media content (320) to the viewer device.

In some implementations, the active region data can be included in the manifest file. In other implementations, they can be provided in separate files or data structures. In some implementations, the active region data can be included in the bitstream header of the media content.

The viewer device receives the manifest file and active region data (325). Using the manifest file, the viewer device can request a fragment of the media content for playback (330) from an edge server. The edge server can then provide that requested fragment to the viewer device (335). The viewer device can then store that fragment in a playback buffer (340). Eventually, the playhead (representing the current point in time during the duration of the playback of the media content) reaches a point in which an image frame of the fragment stored in the playback buffer is played back based on the characteristics of the viewer device and the active region data (345).

A variety of characteristics of the viewer device can be considered to determine how to play back a portion of the image frame. For example, characteristics of the viewer device, such as dimensions of the display screen size, aspect ratio of the dimensions of the display screen (e.g., 16:9, 4:3, etc.), and orientation of the display screen (e.g., portrait or landscape) can be considered.

The portion of the image frame can also be played back in several different ways based on the active region data. For example, as described in regards to FIG. 1, active region data 125 might indicate a single active region 135 for image frame 130. If image frame 130 is to be played back on a smartphone, for example, with a 4.7-inch display screen having a 16:9 aspect ratio, then image frame portion 150, which is the area of image frame 130 that is indicated by active region 135 of active region data 125 might be played back. That is, even though image frame 130 might be received and stored in the playback buffer of viewer device 105, only a portion of it is portrayed on the display screen of viewer device 105 in FIG. 1. This results in that portion occupying more of the display screen when the image frame is played back because the other portions of image frame 130 are not displayed. For example, the portion corresponding to active region 135 might fill out most or the entirety of the display screen.

Another viewer device, such as a television having a 40-inch display screen with a 16:10 aspect ratio might play back image frame 130 differently even though it also receives the same active region data 125. For example, the television might play back all of image frame 130, resulting in playing back more of image frame 130 than the smartphone in the prior example which plays back image frame portion 150. The playback of the same media content on the television might play back all of image frame 130 because the size of the display screen is large enough such that the content within the active region can still be easily viewed. As a result, the viewer device can determine the size (or other viewer device characteristic, such as aspect ratio, orientation, etc.) of its display screen and play back a portion of image frame 130 including all of the portion associated with active region 135 based on the size of the display screen.

In some implementations, the viewer device can determine whether to play back a portion of image frame 130 based on user preferences. For example, one smartphone with an active region playback option enabled might play back image frame portion 150 (i.e., not all of image frame 130) while another smartphone with the active region playback option disabled might play back all of image frame 130.

In some implementations, the playback of image frame 130 on the display screen might be centered on the portion corresponding to active region 135. For example, the portion of image frame 130 corresponding to active region 135 can be played back in the middle of the display screen of the viewer device with other portions of image frame 130 surrounding it. In some implementations, only the portion of image frame 130 corresponding to active region 135 might be displayed on the display screen. For example, the active region can be displayed with the whole screen. If the aspect ratio of the active region is different from the aspect ratio of the display screen, then the portion of image frame 130 to be displayed can be sized to fit (e.g., stretched to occupy the entire horizontal dimension in a landscape orientation) one dimension (e.g., horizontal or vertical) of the display screen. Black bars can be displayed in the areas of the display screen in which no portion of image frame 130 is displayed.

Figure 4A:
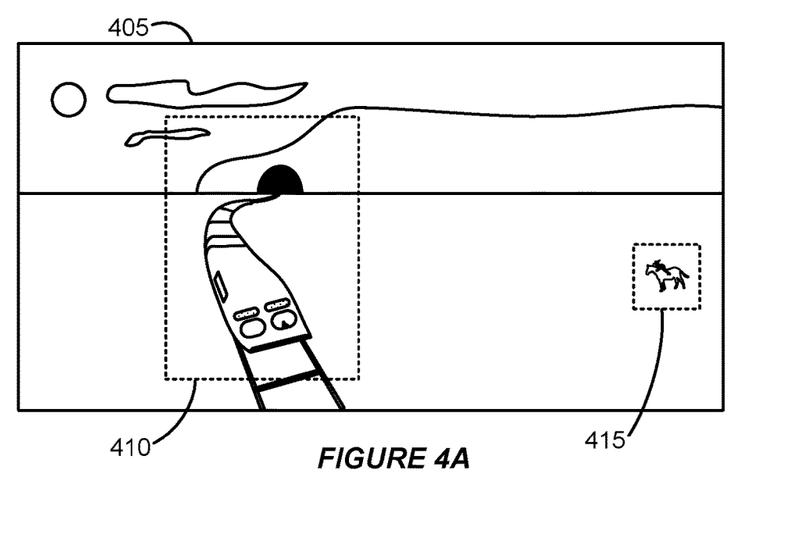
FIGS. 4A and 4B are an example of playing back an image frame having multiple active regions.

Some image frames might be associated with multiple active regions. That is, active region data for one image frame might indicate that there are several regions of interest in that image frame. FIG. 4A is an example of an image frame having multiple active regions. In FIG. 4A, a viewer device can be provided active region data indicating that image frame 405 has active regions 410 and 415. This can result in the viewer device displaying both portions of image frame 405 corresponding to those active areas. For example, if the viewer device is playing back the media content in a portrait orientation then the portions of image frame 405 corresponding to active regions 410 and 415 might be displayed in a vertical split screen.

Figure 4B:
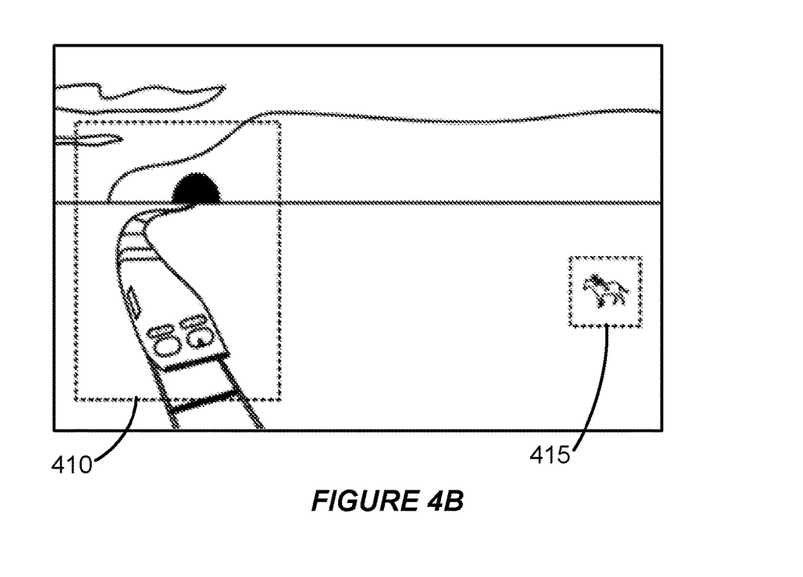

As an example, FIG. 4B shows a portion of image frame 405 with active regions 410 and 415 that is played back. In FIG. 4B, the portion of image frame 405 to the left of active region 410 is not played back so that the remainder of image frame 405 (that includes both active regions 410 and 415) is played back. This results in portions of image frame 405 indicated by active regions 410 and 415, as well as the portions in between, being played back.

Figure 5A:
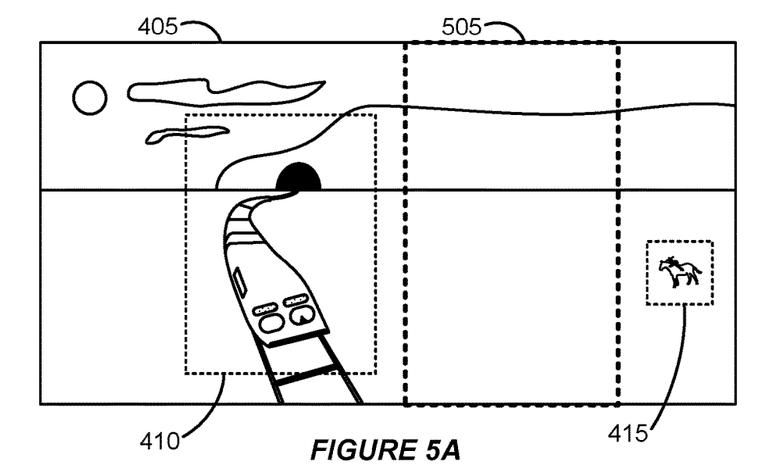
FIGS. 5A and 5B are an example of playing back a portion of an image frame having multiple active regions.
Figure 5B:
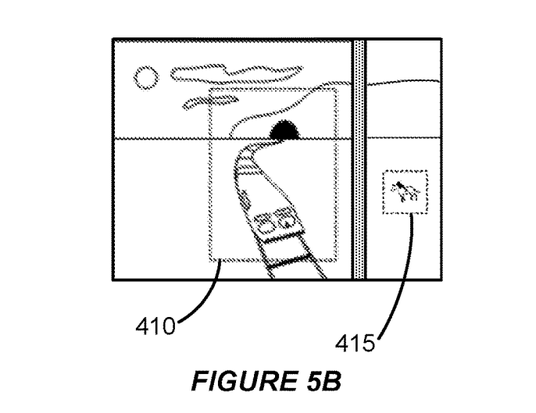

In another example, a horizontal split screen can be performed in which a portion of an image frame in between active areas might not be played back. FIGS. 5A and 5B are an example of playing back a portion of an image frame having multiple active regions. In FIG. 5A, a viewer device can determine that active areas 410 and 415 are separated from each other in image frame 405 by portion 505. Portion 505 can be removed or shrunk such that less of it played back on the display screen of the viewer device, resulting in the portions of image frame 405 corresponding to active regions 410 and 415 being played back on a smaller display screen. For example, in FIG. 5B, portion 505 can be removed (i.e., not played back) and replaced with a black bar providing a horizontal split screen of two different portions of image frame 405 that were separated by portion 505.

In another example, if active regions 410 and 415 exist among multiple image frames during the playback of the media content (e.g., image frame 405 and the next fifteen frames have the same active regions 410 and 415), then one active region can be displayed for a duration and then the second active region can be displayed. For example, the portion of image frame 405 corresponding to active region 410 might be displayed first. Fifty image frames later, the portion of that image frame corresponding to active region 415 might be displayed second. In another example, the playback of the image frame can pan, or move, from one active region to another.

In some implementations, in addition to indicating portions of an image frame in which a viewer would likely be paying attention to, the active region data can also include priorities for displaying the active regions. For example, in FIG. 4A, active region 410 can be indicated as having a higher priority than active region 415. If a viewer device has a display screen size below a threshold size (e.g., less than 6-inches), then the highest priority active region might be displayed. In the example of FIG. 4A, this would result in the portion of image frame 405 corresponding to active region 410 being played back on the viewer device while active region 415 is not played back. If the viewer device has a display screen size above the threshold size, then image frame 405 might be played back such that both active regions 410 and 415 are played back at the same or similar time.

In some implementations, the active region data can also indicate whether an active region of an image frame includes content (e.g., people, objects, etc.) that is producing sound in the playback experience. For example, in FIG. 4A, the train in active region 410 might be stopped, but the horse in active region 415 might be galloping. As a result, in the audio soundtrack during the playback of image frame 405, the sound of the horse's galloping might be the only sound played. This might mean that a viewer device should play back the portion of image frame 405 corresponding to active region 415 to allow the audio playback to be synchronized with the video playback on the viewer device.

In some implementations, a viewer device may include a camera that can be used to determine how far away the viewer or viewers are from the display screen. This distance data can be used to also determine how to play back image frames of the media content. For example, if a viewer is watching on a television relatively close to the display screen, then the entire image frame might be played back. By contrast, if the viewer is watching on the same television from much farther away, then the portions of the image frame corresponding to the active regions may be played back in a similar manner as described herein.

In some implementations, the playback of the audio for the media content can also be modified based on the playback of the video of the media content using the active region data. Some audio sources for media content might incorporate surround sound techniques in which the audio playback for the media content includes an object-based audio soundtrack. As an example, objects in a scene of the video of the media content might be associated with a sound represented in the audio playback. For example, in FIG. 4A, the train depicted within active region 410 and the horse depicted within active region 415 might be associated with different noises such as the train squealing to a stop and the sound of the horse's hooves as it gallops across the terrain. In some surround sound techniques, different audio speakers in a theater setup might receive different audio feeds to generate a three-dimensional audio space such that the sound of the train appears to be coming from a different direction or source location within the three-dimensional audio space than the horse. If the play back of image frame 405 results in active region 410 (i.e., the train) being played back but active region 415 (i.e., the horse) not being played back, then the audio might be adjusted based on the play back of the active regions. For example, the source location for the horse as an audio object within the three-dimensional audio space might be changed such that it is associated with a different coordinate within the three-dimensional audio space. As a result, cropping image frame 405 using the active region data can result in the source locations for audio objects to change such that the audio playback can be modified along with the video playback.

Though many of the examples describe adaptive bitrate streaming using fragments, the techniques disclosed herein can also be used in other scenarios. For example, cable television, satellite broadcasts, etc. in which media content is not provided in fragments (e.g., packets, streams, etc.) can also use the aforementioned techniques. That is, portions of the media content can be provided via fragments, packets, etc.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method comprising:
    requesting, by a media device, media content for playback;
    receiving, by the media device, manifest data indicating playback options for video fragments of the media content, the manifest data including active region data representing portions of image frames of the video fragments of the media content, the portions of the image frames represented by the active region data corresponding to visually important content;

requesting, by the media device, a selected video fragment of the media content using the manifest data;
storing, by the media device, the selected video fragment in a playback buffer for playback of the media content; and
playing back, on a display screen of the media device, a cropped image frame corresponding to a first image frame of the selected video fragment based on characteristics of the media device and the active region data for the first image frame, the cropped image frame including a first portion of the first image frame, and excluding a second portion of the first image frame.

2. The computer implemented method of claim 1, wherein the first portion of the first image frame is represented by the active region data for the first image frame.

3. The computer implemented method of claim 1, wherein the characteristics of the media device include one or more of a display screen size, a display screen aspect ratio, or a display screen orientation.

4. A media device comprising:
one or more processors and memory configured to:
receive manifest data including active region data representing portions of image frames of the media content, the portions of the image frames represented by the active region data corresponding to visually important content;
request a video fragment of the media content using the manifest data, the video fragment having a first image frame of the media content;
receive the first image frame of the media content, the first image frame including image data representing an image, portions of the image data representing corresponding portions of the image;
play back a cropped image frame including a first portion of the first image frame and excluding a second portion of the first image frame based on characteristics of the media device and the active region data in the manifest data.

5. The media device of claim 4, wherein the characteristics of the media device include one or more of a display screen size, a display screen aspect ratio, or a display screen orientation.

6. The media device of claim 4, wherein the active region data indicates that the first portion of the first image frame is more important than the second portion of the first image frame.

7. The media device of claim 4, wherein the active region data indicates the second portion of the first image frame, the first portion of the first image frame prioritized for play back over the second portion of the first image frame.

8. The media device of claim 4, wherein the first portion of the first image frame is played back in a center of a display screen of the media device.

9. The media device of claim 8, wherein the first portion of the first image frame is not in a center of the first image frame.

10. The media device of claim 4, wherein the active region data indicates coordinates of the first portion of the first image frame.

11. A computer program product comprising one or more non-transitory computer-readable media having computer program instructions stored therein, the computer program instructions being configured such that, when executed by one or more computing devices, the computer program instructions cause the one or more computing devices to:
receive manifest data including active region data representing portions of image frames of the media content, the portions of the image frames represented by the active region data corresponding to visually important content;
request a video fragment of the media content using the manifest data, the video fragment having a first image frame of the media content;
receive the first image frame of the media content, the first image frame including image data representing an image, portions of the image data representing a plurality of portions of the image;
play back a cropped image frame including a first portion of the first image frame and excluding a second portion of the first image frame based on characteristics of the computing device and the active region data in the manifest data.

12. The computer program product of claim 11, wherein the characteristics of the computing device include one or more of a display screen size of the computing device, a display screen aspect ratio of the computing device, or a display screen orientation of the computing device.

13. The computer program product of claim 11, wherein the active region data indicates that the first portion of the first image frame is more important than the second portion of the first image frame.

14. The computer program product of claim 11, wherein the active region data indicates the second portion of the first image frame, the first portion of the first image frame prioritized for play back over the second portion of the first image frame.

15. The computer program product of claim 11, wherein the first portion of the first image frame is played back in a center of a display screen of the computing device.

16. The computer program product of claim 15, wherein the first portion of the first image frame is not in a center of the first image frame.

17. The computer program product of claim 11, wherein the active region data indicates coordinates of the first portion of the first image frame.

18. The computer implemented method of claim 1, wherein the cropped image frame of the selected video fragment is further based on distance data indicating a distance between the media device and a viewer.

19. The media device of claim 4, wherein the cropped image frame is further based on distance data indicating the distance between the media device and a viewer.

20. The computer program product of claim 11, wherein the cropped image frame is further based on distance data indicating the distance between the one or more computing devices and a viewer.

21. The computer implemented method of claim 1, further comprising:
receiving an audio fragment of the media content, the audio fragment including a first soundtrack synchronized to the first image frame of the media content;
playing back a modified soundtrack including a first portion of the first soundtrack and excluding a second portion of the first soundtrack based on characteristics of the media device and the active region data in the manifest data.

22. The media device of claim 4, wherein the one or more processors and memory are further configured to:
receive an audio fragment of the media content, the audio fragment including a first soundtrack synchronized to the first image frame of the media content;
play back a modified soundtrack including a first portion of the first soundtrack and excluding a second portion of the first soundtrack based on characteristics of the media device and the active region data in the manifest data.

23. The computer program product of claim 11, the computer program instructions being further configured to:
receive an audio fragment of the media content, the audio fragment including a first soundtrack synchronized to the first image frame of the media content;
play back a modified soundtrack including a first portion of the first soundtrack and excluding a second portion of the first soundtrack based on characteristics of the media device and the active region data in the manifest data.

\* \* \* \* \*